Oct. 9, 1945.    J. OLSON    2,386,567

TOGGLE CLAMPING DEVICE

Filed May 22, 1942

Inventor
John Olson

By

J. S. Murray
Attorney

Patented Oct. 9, 1945

2,386,567

UNITED STATES PATENT OFFICE 2,386,567

TOGGLE CLAMPING DEVICE

John Olson, Detroit, Mich.

Application May 22, 1942, Serial No. 444,117

2 Claims. (Cl. 144—290)

This invention relates to clamping devices and particularly toggle clamping devices suited for clamping work on a support during a cutting or other operation, and adapted to be quickly applied to or released from the work.

An object of the invention is to pivot a clamping arm and a lever for actuating said arm individually on a suitable bracket and to interconnect the arm and lever by a link having a toggle coaction with the lever, the arrangement being such that the lever lies close adjacent to and in approximate parallelism with the arm when a clamping function is derived, minimizing the space requisite to accommodate the device.

Another object is to minimize the number of parts and achieve a maximum simplicity in constructing a clamping device using a toggle linkage to derive a mechanical advantage and to lock the device in its work-clamping position.

These and various other objects are attained by the construction hereinafter described and illustrated in the accompanying drawing, wherein.

Figure 1:
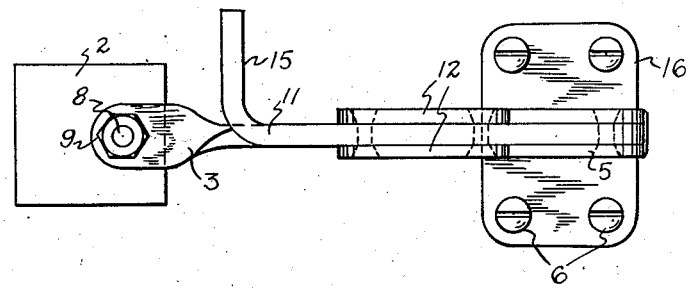
Fig. 1 is a top plan view of the device taking effect on a piece of work.
Figure 2:
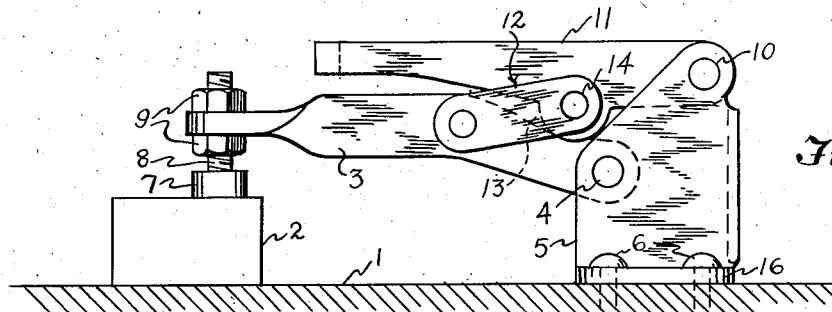
Fig. 2 is a side elevational view of the same.
Figure 3:
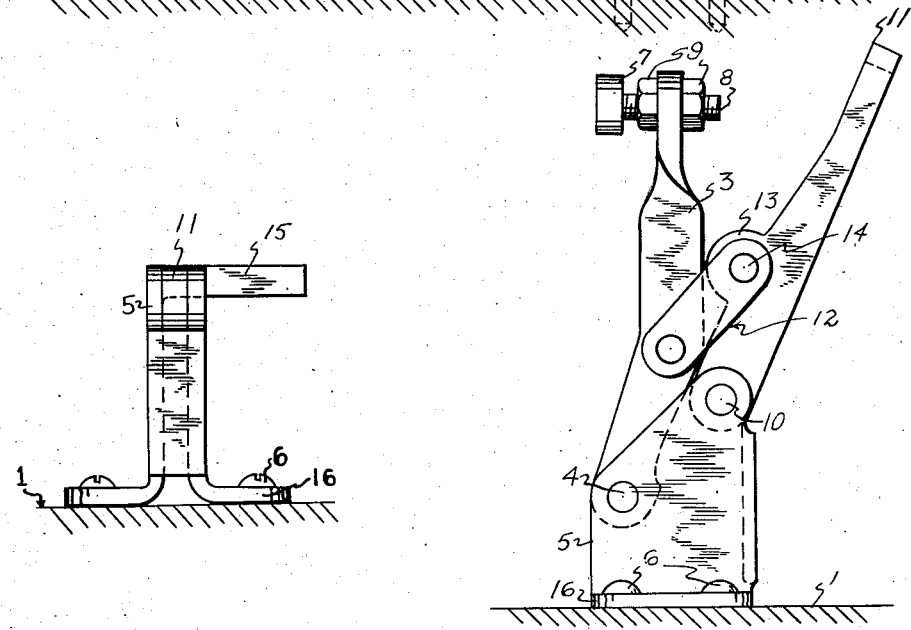
Fig. 3 is an end view of the same.

In these views, the reference character 1 designates a base plate serving as a support for a piece of work 2. For clamping the work firmly on said base, an arm 3 has one end pivoted at 4 on a bracket 5 secured by screws 6 or the like to the base 1. The other end of the arm engages the work through a clamping head 7 provided with a threaded shank 8 extended through the arm and having lock nuts 9 seating against opposite faces of the arm. Thus, said shank may be adjusted with respect to the arm to suit the device to different thicknesses of work. Pivoted at a higher point 10 on the bracket 5 is a lever 11 connected to the arm 3 by a pair of links 12 for actuating the arm, the lever having a lug 13 projecting toward the arm to accommodate the rivet 14 attaching the links to the lever and to form a limiting stop. The lever and arm swing in a common plane and the free end portion of the lever is bent as indicated at 15 to provide a handle which may be gripped without the arm forming an obstruction.

The bracket 5 is preferably a sheet metal stamping, having an upright portion bent to form spaced parallel walls between which the arm and lever are pivoted, and wings 16 being oppositely extended from said walls to form a base for engagement by the screws 6.

In use of the described device, the arm 3 in its clamping position lies substantially parallel to the base 1. The lever 11 is swung down in close proximity to the arm and substantially parallel thereto. In approaching the described position, the portion of the lever between its pivot and the links 12 has a toggle coaction with said links to greatly multiply the applied pressure and to finally lock the arm in its clamping position. Locking is effected by forcing the rivet 14 slightly below the plane established jointly by the pivot 10 and the rivet joining the links to the arm. Seating of the lug 13 against the arm determines the locking position. It is important to note that the described arrangement minimizes the space measured transversely to the base 1 necessary to accommodate the device, permitting it to function where clearance afforded by parts of a machine or by an overhanging part of the work is quite limited.

Figure 4:
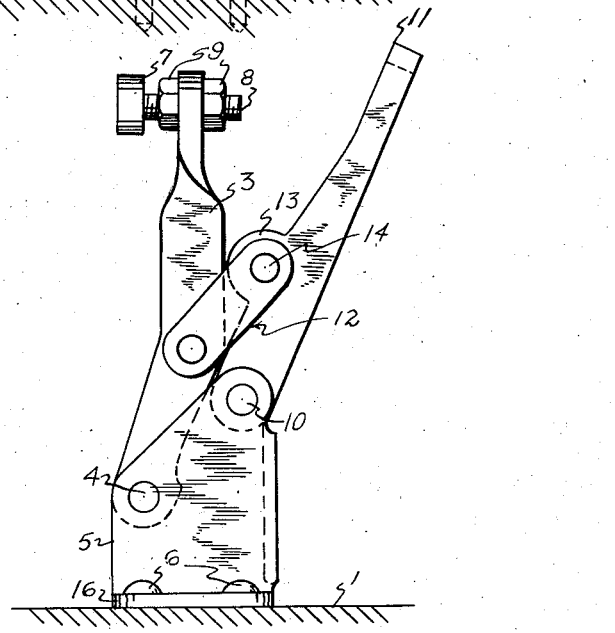
Fig. 4 is a side elevational view of the device in released position.

A slight upward actuation of the lever suffices to relieve the work of clamping pressure, but it is preferred to shift the lever and arm to the upright position shown in Fig. 4, on releasing the clamp, since such position is self-maintained and assures ample clearance for disposing the next piece of work in clamping position. Swinging the lever and arm to upright position, in relieving clamping pressure detracts nothing from advantage gained in reducing the device to a compact form when exercising its clamping function, since the base 1 is usually readily portable and permits the work and the described device to be removed from a working position upon completion of any desired operation. It will be noted that the lug 13 of the lever engages the arm to establish the upright position of the lever and arm, just as it does to establish the lowered and locked position of said parts.

By bending the free end portion of the lever through a right angle the resulting handle permits manipulation of the lever without risk of a workman's fingers being squeezed between the lever and arm.

By reason of the simplicity of the device and its formation from standard bar stock and stampings, it may be produced quite inexpensively.

What I claim is:

1. A toggle clamping device comprising a bracket having spaced walls, a clamping arm having an end pivoted on said bracket between said walls, an actuating lever for said arm having an end pivoted on said bracket between said walls, the pivots of said arm and lever being predeterminedly spaced with the lever pivot more remote from the base of said bracket than the arm pivot, and a pair of links disposed at opposite sides of and pivotally connected at their ends to the arm and lever and forming an actuating connection from the lever to the arm, the lever being movable into substantial parallelism with the arm to effect clamping, and the links being concurrently movable to establish their lever-engaging ends between their arm-engaging ends and the bracket-engaging pivotal end of the lever.

2. A toggle clamping device comprising a bracket having a base, a clamping arm, an actuating lever for said arm, spaced parallel pivots mounting the arm and lever on the bracket, the lever pivot being more remote from the bracket base than the arm pivot, and a link pivotally connected at its ends to the lever and arm and forming an actuating connection from the lever to the arm, said link being movable at its lever-engaging end between its arm-engaging end and the bracket-engaging lever pivot to afford the lever a toggle advantage and lock the arm in a clamping position, the lever and arm abutting in two different positions thereof to limit both clamping and releasing actuation of the device.

JOHN OLSON.